United States Patent
Ward

(10) Patent No.: US 7,226,112 B2
(45) Date of Patent: Jun. 5, 2007

(54) PINCH WARNING AND ILLUMINATION SYSTEM

(75) Inventor: Kenneth H. Ward, Pearson, MI (US)

(73) Assignee: Nicholas Plastics Incorporated, Allendale, MI (US)

(*) Notice: Subject to any disclaimer, the term of this patent is extended or adjusted under 35 U.S.C. 154(b) by 10 days.

(21) Appl. No.: 10/846,434

(22) Filed: May 14, 2004

(65) Prior Publication Data

US 2005/0073852 A1    Apr. 7, 2005

Related U.S. Application Data

(60) Provisional application No. 60/546,136, filed on Feb. 20, 2004, provisional application No. 60/508,089, filed on Oct. 2, 2003.

(51) Int. Cl.
*B60J 5/02* (2006.01)

(52) U.S. Cl. .................... 296/146.8; 340/463

(58) Field of Classification Search ............ 296/146.1, 296/146.8; 49/475.1; 340/463; 362/501
See application file for complete search history.

(56) References Cited

U.S. PATENT DOCUMENTS

| | | | |
|---|---|---|---|
| 3,590,768 A | 7/1971 | Shanok et al. | |
| 4,048,630 A | 9/1977 | Deming et al. | |
| 4,452,058 A | 6/1984 | Noel | |
| 4,559,517 A | 12/1985 | Rahn | |
| 4,758,931 A | 7/1988 | Gabaldon | |
| 4,785,293 A | 11/1988 | Shearer et al. | |
| 4,851,746 A * | 7/1989 | Milke | 318/467 |
| 4,912,454 A | 3/1990 | Solow | |
| 4,937,029 A | 6/1990 | Ishiharada et al. | |
| 4,984,385 A * | 1/1991 | DeLand | 49/280 |
| 4,993,774 A | 2/1991 | Greenhalgh et al. | |
| 5,016,145 A | 5/1991 | Singleton | |
| 5,025,351 A | 6/1991 | Martin | |
| 5,121,098 A | 6/1992 | Chen | |
| 5,163,731 A | 11/1992 | Gold | |
| 5,180,223 A | 1/1993 | McNamee | |
| 5,193,895 A | 3/1993 | Naruke et al. | |
| 5,211,466 A | 5/1993 | Jarocki et al. | |
| 5,229,746 A | 7/1993 | Healy et al. | |
| 5,255,164 A | 10/1993 | Eidelman | |
| 5,281,947 A | 1/1994 | Durley et al. | |
| 5,281,949 A | 1/1994 | Durley et al. | |
| 5,333,227 A | 7/1994 | Ishiharada et al. | |
| 5,424,924 A | 6/1995 | Ewing et al. | |
| 5,434,487 A * | 7/1995 | Long et al. | 318/286 |

(Continued)

FOREIGN PATENT DOCUMENTS

DE    19744240    4/1999

(Continued)

*Primary Examiner*—Lori L. Lyjak
(74) *Attorney, Agent, or Firm*—Price, Heneveld, Cooper, DeWitt & Litton, LLP

(57) ABSTRACT

A light source is incorporated into a weatherstrip or pinch strip assembly mounted on a movable panel or at the opening in a frame or panel which receives the movable panel. The light is illuminated to warn that a movable panel of a vehicle is about to close or open, is closing or opening, or that an obstruction has been encountered. The light can operate intermittently during opening or closing, and continuously when the movable panel is open.

37 Claims, 2 Drawing Sheets

U.S. PATENT DOCUMENTS

| | | |
|---|---|---|
| 5,493,269 A | 2/1996 | Durley et al. |
| 5,495,400 A | 2/1996 | Currie |
| 5,580,628 A | 12/1996 | Cordes et al. |
| 5,602,526 A | 2/1997 | Read |
| 5,669,699 A | 9/1997 | Pastrick et al. |
| 5,669,704 A | 9/1997 | Pastrick |
| 5,728,984 A * | 3/1998 | Miller ................... 200/61.43 |
| 5,783,312 A | 7/1998 | Laughman et al. |
| 5,803,577 A | 9/1998 | Stratton |
| 5,803,579 A | 9/1998 | Turnbull et al. |
| 5,828,299 A | 10/1998 | Chen |
| 5,839,231 A | 11/1998 | Gebhart et al. |
| 5,848,837 A | 12/1998 | Gustafson |
| 5,864,439 A | 1/1999 | Gold |
| 5,880,421 A * | 3/1999 | Tsuge et al. ............ 200/61.44 |
| 5,915,830 A | 6/1999 | Dickson et al. |
| 5,938,321 A | 8/1999 | Bos et al. |
| 5,998,746 A | 12/1999 | Clark |
| 6,011,492 A | 1/2000 | Garesche |
| 6,030,108 A | 2/2000 | Ishiharada et al. |
| 6,081,088 A * | 6/2000 | Ishihara et al. ............ 318/466 |
| 6,104,371 A | 8/2000 | Wang et al. |
| 6,104,857 A | 8/2000 | Ishiharada et al. |
| 6,132,056 A | 10/2000 | Ruthenberg |
| 6,145,918 A | 11/2000 | Wilbanks, II |
| 6,152,590 A | 11/2000 | Fürst et al. |
| 6,163,080 A | 12/2000 | Castellon |
| 6,184,786 B1 | 2/2001 | Medeiros |
| 6,252,500 B1 | 6/2001 | Chueh et al. |
| 6,278,827 B1 | 8/2001 | Sugiyama et al. |
| 6,305,736 B1 * | 10/2001 | Enomoto et al. ........ 296/146.1 |
| 6,346,889 B1 | 2/2002 | Moss |
| 6,442,902 B1 | 9/2002 | Van Den Oord |
| 6,471,381 B2 | 10/2002 | Atkinson et al. |
| 2002/0152686 A1 * | 10/2002 | Whitehead ................. 49/475.1 |
| 2003/0095415 A1 * | 5/2003 | Carter ....................... 362/488 |
| 2003/0146606 A1 * | 8/2003 | Hanjono .................. 280/730.2 |
| 2005/0028946 A1 * | 2/2005 | Weishar et al. ............. 160/214 |

FOREIGN PATENT DOCUMENTS

| | | |
|---|---|---|
| DE | 19841180 | 3/2000 |
| DE | 19908902 | 9/2000 |
| FR | 2356961 | 6/1976 |
| FR | 2732927 | 10/1996 |
| WO | 9707350 | 2/1997 |

* cited by examiner

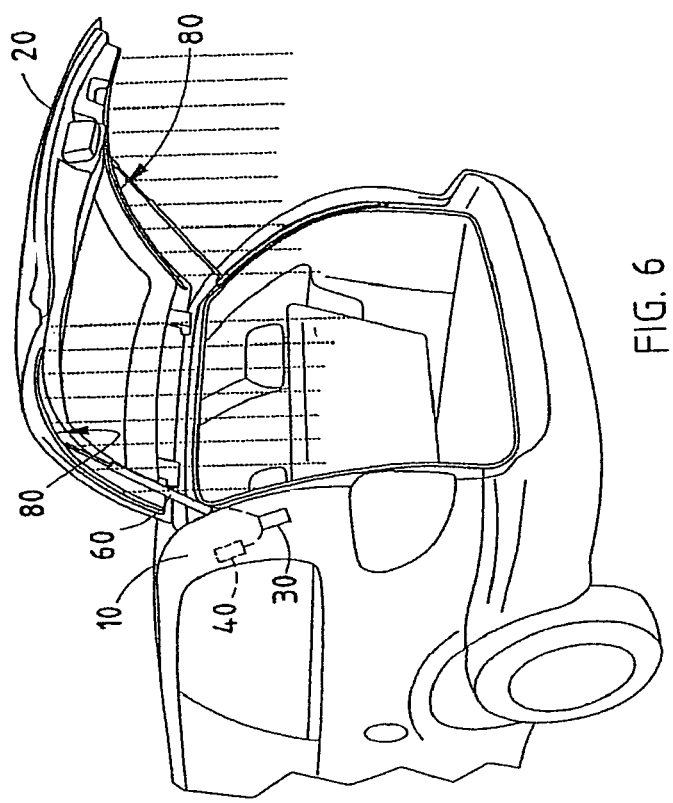
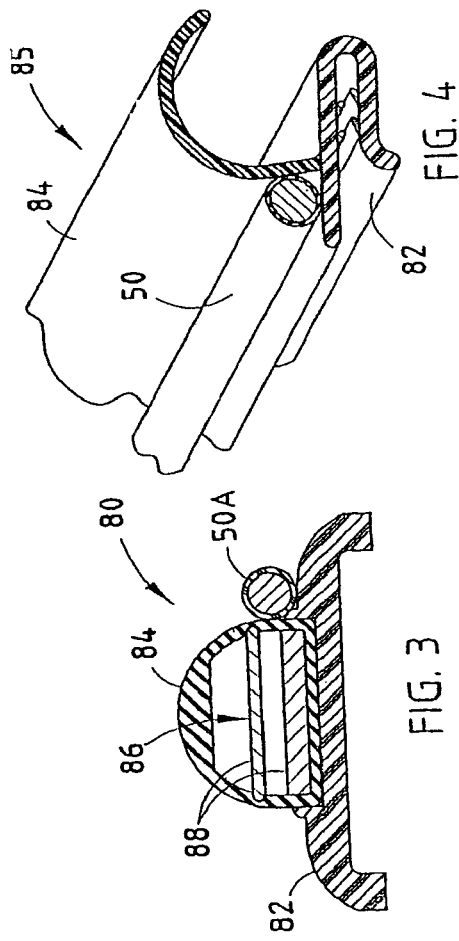
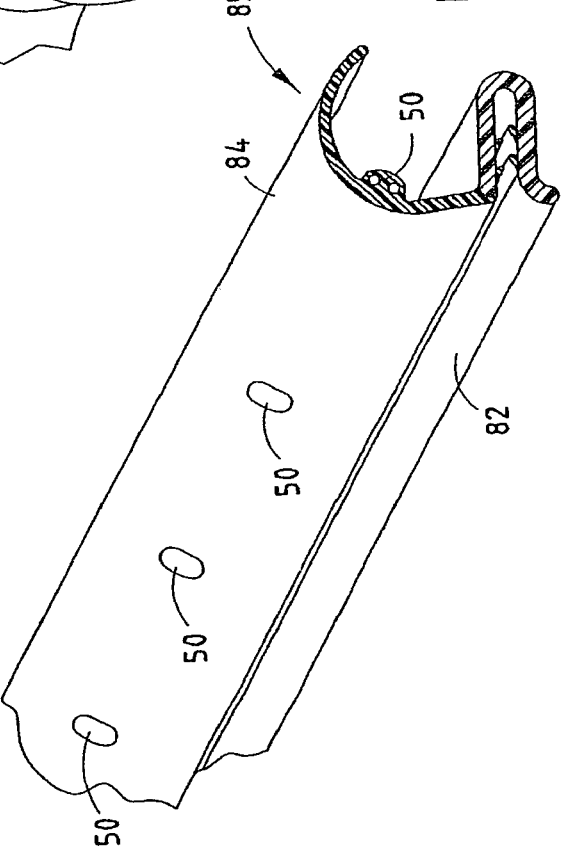

PINCH WARNING AND ILLUMINATION SYSTEM

CLAIM OF PRIORITY

This application claims priority to the Provisional Patent Application entitled PINCH WARNING AND ILLUMINATION SYSTEM, Appln. No. 60/546,136, filed on Feb. 20, 2004 and to Provisional Patent Application No. 60/508,089 filed on Oct. 2, 2003 entitled PINCH WARNING AND ILLUMINATION SYSTEM.

BACKGROUND OF THE INVENTION

The present invention relates to warning systems and lighting systems.

Many of today's vehicles have motor driven panels which open and close upon actuation of a switch. For example, some of today's vehicles are provided with automatic windows or automatic sliding passenger doors, as well as automatic trunks, tailgates, or hatchbacks. These panels, rather than being opened and closed manually, are automatically opened and closed through the use of a motor operatively connected to the driven panel.

In certain circumstances, while closing a movable panel from an open position, a person or object in the path of the closing panel can become injured or damaged by the panel's closing. Therefore, sensing systems have been developed to sense when an obstruction is between the movable panel and a stationary frame during closing of the panel. These sensors typically include a pair of conductive metal strips mounted within a resilient section of the sensor wherein upon closing of the panel, if an obstruction is encountered, the two conductive strips are pushed into contact with one another, thereby sending a signal to the control module to reverse direction of the motor controlling the panel.

These systems are also available with an audible warning that sounds when the close command is actuated.

SUMMARY OF THE INVENTION

In the present invention, a light is incorporated into a weather seal or pinch strip to provide a warning of the movable panel's opening, closing, or to provide illumination when the movable panel is in its open position. These and other objects, features and advantages of the invention will be more fully understood and appreciated by reference to the written specification and appended drawings.

BRIEF DESCRIPTION OF THE DRAWINGS

FIG. 3 is a cross-sectional view of the pinch sensor of FIG. 2;

FIG. 4 is a cross-sectional view of the weatherstrip used in the vehicle of FIG. 1;

FIG. 5 is a fragmentary perspective view of an alternative embodiment of the weatherstrip of FIG. 1; and FIG. 6 is a fragmentary perspective view of an illuminated pinch sensor in accordance with a third embodiment of the present invention.

DESCRIPTION OF THE PREFERRED EMBODIMENTS

Figure 1:
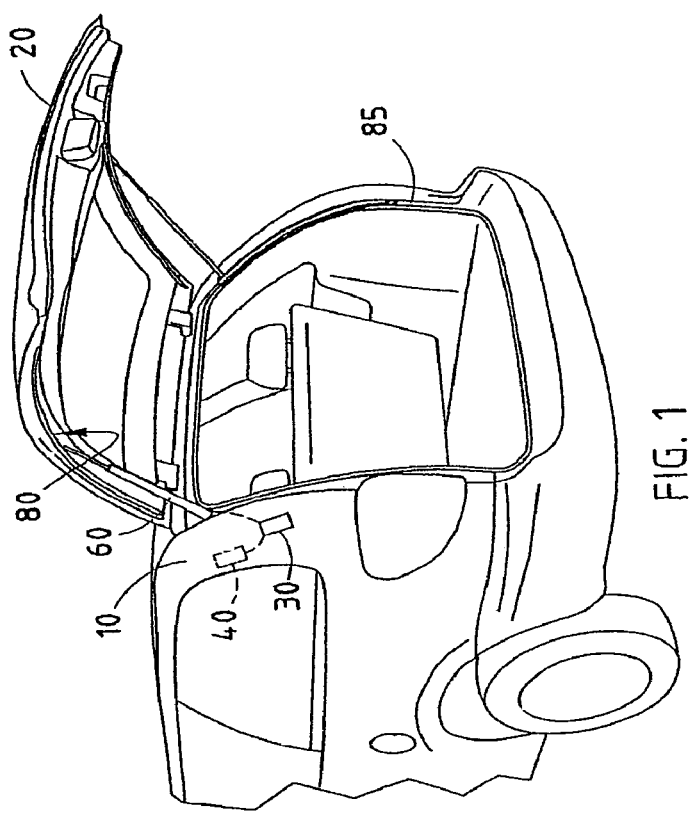
FIG. 1 is a fragmentary perspective view of a vehicle having the pinch sensing warning system and a weatherstrip lighting system in accordance with a first and a second embodiment of the present invention.
Figure 2:
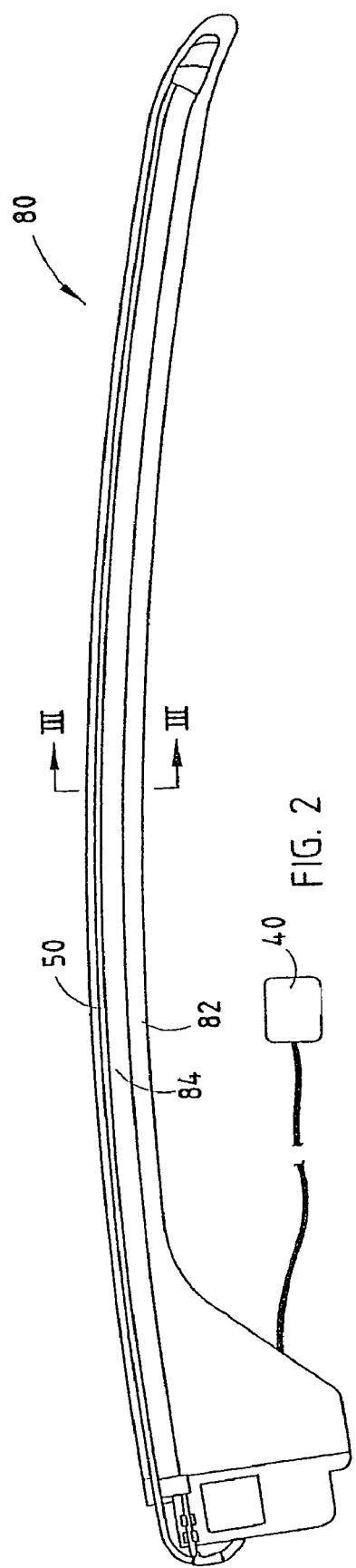
FIG. 2 is a perspective view of the pinch sensor used in the vehicle of FIG. 1.

In preferred embodiments, the invention can be integrated into vehicles or other structures by mounting the lighted weatherstrips or lighted pinch strips on the moved panel, or on the body against which the panel will close. The lighting will then illuminate when the panel is being opened or closed, is open, or encounters an obstruction.

In a first embodiment (FIG. 1), the basic elements of a pinch warning system comprise a vehicle stationary panel or frame 10 and a movable panel 20 articulated to move relative to stationary panel 10. The preferred embodiment uses a drive mechanism or motor 60 to open and close panel 20 upon actuation of a switch. The term "movable panel" or "closure panel" as used herein is to be understood as applied to vehicles to include, without limitation, doors, windows, sunroofs, tailgates, trunks and/or hatchbacks. A sensor 30 is provided to generate a signal upon the opening and/or closing of the movable panel. A control module 40 reads the signal and thereupon illuminates a light or lights 50 incorporated into a pinch strip 80 or weatherstrip 85 mounted between the panel and frame. Additionally, light 50 may be illuminated in a constant or flashing pattern to advise that the movable panel is closing or opening, thereby allowing the vehicle occupants to get out of the way or move any obstructions in order to avoid pinching or crushing the obstruction interfering with the opening or closing of the panel 20. Inadvertent pinching or crushing of an obstruction is avoided by: issuing an illuminated warning to the occupant of the vehicle that the panel is about to be closed; and/or issuing an illuminated warning to the occupant of the vehicle that the panel has encountered an obstruction.

As shown in FIG. 1, stationary panel or frame 10 is generally a vehicle frame upon which movable panel 20 is mounted. Movable panel 20 can be, for example, a door, window, rear hatch or trunk and is generally attached to frame 10 through a pair of hinges. Typically, as is the case when movable panel 20 is a door or a hatch, the movement of panel 20 is arcuate due to its hinged method of attachment. Although this method of attachment allows for relatively unconfined ingress and egress from the vehicle, it can be problematic because of the ease with which occupants' appendages can be crushed between panels 10 and 20 during closings, especially near the hinge points (not shown), where closing forces are the greatest.

Sensor 30 can be any type of device or circuit for indicating that a movable panel 20 is being opened or closed, or is open. Sensor 30 can be mounted to either frame 10 or movable panel 20 and is utilized to detect relative movement between frame 10 and panel 20. Sensor 30 may be mounted anywhere according to specific requirements, and may include mounting to the drive mechanism, control module, or other convenient location. Sensor 30 may sense the flow of current to drive motor 60. Sensor 30 may be a separate circuit which is actuated when the panel closing or opening switch is actuated. The general characteristics of sensor 30 and its method for determining whether or not there is relative movement, and optionally for determining that panel 20 is open is generally well known in the art. Sensor 30 may be mechanical, optical, electrical, or any other method of determining relative movement as well as any combination thereof. As described in more detail below, sensor 30 may also be incorporated directly into pinch strip 80 as sensor 86 (see FIG. 3).

Sensor 30, upon detecting relative movement, and optionally upon detecting when panel 20 is fully open, generates a signal, response or indicator. The specific characteristics of the signal may again vary according to specific requirements. In a preferred embodiment, which utilizes drive mechanism 60, an electrical current sensor is used which detects when an electrical current is established to the motor, thereby providing a signal when drive mechanism 60 is engaged. Notably, as used herein, the term "signal" is to be understood to include a signal, response, indicator or any other communication that is developed by sensor 30 and communicated to control module 40.

Control module 40 may be an electrical, mechanical, optical or other module and responds to the signal from sensor 30 in a predefined manner. Module 40 can be designed or programmed to activate light 50 in a manner suitable to warn the occupants of the vehicle that door 20 is about to be, or is currently, closing. For example, control module 40 may be designed to illuminate light 50 before engaging motor 60, thereby issuing a warning that door 20 is about to close. It could further notify the vehicle occupants by flashing light 50 when it actually drives motor 60, thereby closing door 20. Additionally, light 50 could be illuminated when an obstruction is present in the path of the closing window, door, trunk or hatch. Control module 40 can be programmed to activate light 50 when panel 20 is opening, as well as when it is closing. In one preferred embodiment, module 40 is programmed to cause light 50 to flash when panel 20 is opening or closing, and to be continuously "on" when panel 20 is fully open. As can be seen, control module 40 may be programmed to illuminate light 50 in numerous fashions. When control module 40 reads the signal developed by sensor 30, it can also activate, deactivate and/or reverse drive mechanism 60 in order to open or close panel 20.

As with control module 40, drive mechanism 60 and the specific characteristics thereof are generally well known in the art. In the preferred embodiment, an electrical motor is used and controlled by a programmable control module. Indeed, it is possible to incorporate sensor 30, control module 40 and a motor control module into a single programmable or pre-programmable module.

Light 50 may be, without limitation, an electro-luminescent light, a single or series of light emitting diodes (LEDs), fiber optic cable with associated light source, or a light tube and further, may or may not be enclosed within a protective barrier. A light tube is a clear plastic or translucent tube containing a string or plurality of lights or other generally elongated light source. These examples of light 50 are not meant to be limiting in any manner, and any form of illumination may be used. Moreover, more than one color of light can be used to signify different warnings or events. For example, one might provide a light tube with alternating red and white lights, with the red lights flashing during opening and closing, and the white lights remaining continuously on when panel 20 is open. The same result could be accomplished using two separate fiber optic cables, one illuminated by a flashing red light and the other illuminated by a continuously on white light. These different sources may be used continuously or intermittently and alone or in combination with each other to arrive at the desired warning or response. As illustrated, FIGS. 3 and 4 show embodiments using an elongated light source, while FIG. 5 shows a plurality of LEDs being used.

Light 50 (FIG. 4) or light 50A (FIG. 3) may be incorporated into pinch strip 80 or weatherstrip 85, respectively, by methods which are generally known in the art, for example and without limitation, molding, extrusion, adhesion, or any other method capable of binding light 50 or 50A to the pinch strip 80 or weatherstrip 85, respectively. In various preferred embodiments, light 50 or 50A is affixed to mounting track 82 of pinch strip 80 or weatherstrip 85 (FIGS. 3 and 4). Alternatively, light 50 can be affixed to resiliently compressible portion 84 of a weatherstrip 85 (FIG. 5).

Pinch strips 80 include a mounting track 82 which is designed to be affixed to either the movable panel 20 or frame 10 (FIG. 1). A resiliently compressible hollow portion 84 is disposed on or protrudes from mounting track 82. Mounting track 82 and resiliently compressible hollow portion 84 may be fabricated as one piece or in multiple pieces. Each of them may be fabricated from the same material or different materials and the method of fabrication is not critical to the concept. Additionally, resiliently compressible member 84 includes a sensor 86 (discussed below) for detecting when an obstruction is present between stationary frame 10 and movable panel 20 (FIG. 3). Sensor 86 is used in addition to sensor 30 and, upon detection of an obstruction, sends a signal to sensor 40. Sensor 40 may then react to this event by operating motor 60 and illuminating light 50 as described above.

Pinch strip 80 may be attached to either frame 10 or movable panel 20 and further has sensor 86 which is used to detect if an obstruction has been encountered during the closing of door 20. As best seen in FIG. 3, forming a part of compressible portion 84 is sensor 86 which is generally a pair of spaced apart conductive elements 88 that are in a circuit of known resistance when the pinch sensor is undisturbed. However, when pinch strip 80 encounters an obstruction, resiliently compressible hollow portion 84 is disturbed (for example, pressed together) thereby causing normally spaced apart elements 88 to contact, creating a "closed circuit" with very low or not resistance. This "closed circuit" is the signal which is sent to sensor 40.

The use of pinch strips as a safety feature to limit the closing of a closure panel is generally well known. Further, the general characteristics of sensor 86 and its method for determining whether or not an obstruction is present are also generally well known in the art. For example, the sensor could be an enclosed pinch strip style sensor, an optical sensor, or a current sensor. However, these are examples only and are not meant to be limiting.

Alternatively, or in addition to pinch strip 80, weatherstrip 85 may also have light 50 incorporated into it. As best seen in FIGS. 1, 4 and 5, weatherstrip 85 is adhered to either frame 10 or movable panel 20 and is used to seal the outside environment from the inside of the vehicle. The specifics of weatherstrip 85 are not critical to the inventive concept and any type of Vehicle weatherstripping may be used. In one embodiment, weatherstrip 85 includes a resiliently compressible portion 84 projecting from or adhered to mounting track 82.

Light 50 may be incorporated into the weatherstripping as described above and includes, without limitation, molding, extrusion, adhesion, or any other method capable of binding light 50 to the weatherstrip. As described previously, light 50 may be, without limitation, an electro-luminescent light, a single or series of light emitting diodes (LEDs), fiber optic cable with associated light source, or a light tube and further, may or may not be enclosed within a protective barrier. FIG. 5 illustrates a series of LEDs. Additionally, weatherstrip 85 is not limited to the rear doors of the vehicle, as shown, but may be used on any door, window or other part of the vehicle that requires sealing. Although weatherstrip 85 may have various sensors incorporated into it, in the preferred embodiment, the weatherstrip does not have a built-in sensor and sensor 30 is used to send a signal to control module 40 to effectuate light illumination. As described above with regard to pinch strip 80, weatherstrip 85 may be fabricated from the same or different materials and may also be fabricated from single or multiple pieces.

An additional feature of the illuminated pinch strip or weatherstrip is shown in FIG. 6. Instead of or in addition to light 50 acting as a warning, light 50 can be used to illuminate the area around door 20. Additionally, with regard to pinch strip 80, since it must be in communication with control module 40 and since this is typically an electrical communication, light 50 can be illuminated utilizing the existing wiring of the pinch strip. Therefore, this embodiment adds the benefits of illuminating the area of door 20 without the need for additional wiring or additional interior dome lights.

Further, in addition to providing a convenient light source, light 50 provides the additional safety feature of notifying oncoming traffic of the vehicle's presence. This is especially useful since the current safety features consist of reflective stickers which rely on light from the oncoming vehicle's headlights to reflect off of the sticker and back to the oncoming driver. This design depends upon the light given off of the oncoming vehicle as well as various reflective angles making the reflected light variable, and in certain cases, non-existent. However, when light 50 is used, the illumination does not depend on reflected light, thereby providing a more positive indication of the vehicle's presence to oncoming traffic.

Of course, it is understood that the foregoing are preferred embodiments and changes and variations can be made without departing from the spirit and broader aspects of the invention, as defined in the appended claims, which are to be interpreted in accordance with the principles of patent law, including the Doctrine of Equivalents.

The invention claimed is:

1. A warning device for mounting on one of a powered movable member or a stationary member of a motor vehicle, said warning device comprising:
   an elongated resiliently compressible member;
   lighting operably connected to and extending along at least a portion of the length of said elongated compressible member; and
   a controller actuating said lighting and causing said lighting to emit light continuously or intermittently when said controller receives a signal indicating that said powered movable member is moving relative to said stationary member.

2. The warning device of claim 1, which further includes:
   a mounting member which mounts to one of said movable panel or said stationary member;
   said compressible member being positioned on said mounting member; and
   said lighting being affixed to said mounting member.

3. The warning device of claim 1, in which:
   said lighting comprises one of an elongated light tube or cable.

4. The warning device of claim 2, in which:
   said lighting comprises an elongated tube or cable.

5. A warning and/or illumination system for incorporation into a structure having a powered movable member associated with a fixed member, said powered movable member moving between an open position and a closed position relative to said fixed member upon actuation of a powered actuator operably interconnecting said powered movable member and said fixed member, said system comprising:
   one of a weather seal or a pinch strip device for securing to one of said powered movable member or said associated fixed member;
   lighting operably connected to at least a portion of the length of said one of said weather seal or said pinch strip; and
   a controller activating said lighting to provide a warning when said powered movable member is moving under power relative to said fixed member, regardless of whether or not the controllers receives a signal indicating the presence of an object.

6. The system of claim 5, in which:
   said controller causes said lighting to flash as said powered movable member moves under power towards its closed position relative to said fixed member.

7. The system of claim 6, in which:
   said controller activates a light flashing circuit to thereby cause said lighting to flash when said powered movable member is moving under power either towards its closed position or towards its opened position.

8. The system of claim 7, in which:
   said controller activates said lighting to remain continuously on when said movable member is open.

9. The system of claim 5, in which:
   said controller causes said lighting to remain continuously on when said powered movable member is located in its open position relative to said fixed member.

10. The system of claim 5, in which:
    said lighting comprises one of an elongated light tube or cable.

11. The system of claim 5, in which:
    said lighting comprises a plurality of LEDs disposed on a compressible portion of said pinch strip or weather seal.

12. The system of claim 5, in which:
    said lighting comprises lights of two different colors; and,
    said controller activating lighting of one color when said powered movable member is moving either towards its open position or towards its closed position, and activating the other color of lighting when said powered movable member is located in its open position.

13. The system of claim 12, in which:
    said controller causes said first colored lights to flash as said powered movable member is moving, and causes said second colored lighting to remain continuously on when said powered movable member is in its open position.

14. The system of claim 13, in which:
    said first colored lights which flash as said movable member is moving are red, and said second colored lights which remain continuously on when said movable member is open are white.

15. The system of claim 5, in which said one of said weather seal and pinch strip comprises an elongated member having spaced apertures therein, said lighting being located inside said elongated member so as to be visible at said apertures.

16. The system of claim 15, in which said lighting comprises an elongated light tube or light cable.

17. The system of claim 15, in which said lighting comprises LEDs located at said apertures.

18. An automobile comprising:
    a powered actuator;
    a body and a panel which moves relative to the body between an open position and a closed position upon actuation of said powered actuator;

one of a weather seal or a pinch strip device for securing to one of said panel or said body;
lighting operably connected to at least a portion of the length of said one of said weather seal or said pinch strip;
a controller activating said lighting upon receiving a signal indicating that said powered actuator is being actuated such that said panel is, or will be, closing relative to said body.

19. The automobile of claim 18, in which:
said controller activates a light flashing circuit to thereby cause said lighting to flash when said panel is moving under power either towards its closed position or towards its opened position.

20. The automobile of claim 19, in which:
said controller activates said lighting to remain continuously on when said panel is open.

21. A weather seal or pinch strip comprising:
a mounting member;
an elongated, resiliently compressible member positioned on said mounting member;
a lighting member; secured to said compressible and
a controller configured to control said lighting member and cause said lighting member to be illuminated, based at least in part upon actuation of a powered actuator that moves a movable vehicle panel relative to a fixed vehicle structure.

22. The weather seal or pinch strip of claim 21, in which:
said lighting comprises one of an elongated light tube or cable positioned on said mounting member.

23. The weather seal or pinch strip of claim 21, in which:
said lighting comprises a plurality of LEDs disposed on said elongated member.

24. A weather seal or pinch strip comprising:
an elongated, resiliently compressible member;
a lighting member secured to said compressible member; and wherein:
said elongated compressible member includes spaced apertures therein;
said lighting is located inside said elongated compressible member so as to be visible at said apertures; and
a controller causing said lighting to be actuated due to a signal indicative of a powered panel being actuated for powered movement relative to a stationary structure.

25. The weather seal or pinch strip of claim 24, in which:
said lighting comprises one of an elongated light tube or cable positioned on said mounting member.

26. The weather seal or pinch strip of claim 24, in which said lighting comprises LEDs located at said apertures.

27. The weather seal or pinch strip of claim 25, in which:
said lighting comprises a plurality of LEDs disposed on said elongated member.

28. A weather seal or pinch strip comprising:
an elongated resiliently compressible member;
an elongated mounting member to which said compressible member is secured, said mounting member including at least one flange projecting from said resiliently compressible member, said mounting member adapted for securing to a vehicle;
a lighting member secured to one of said flange of said mounting member and said resiliently compressible member; and
a controller causing said lighting to be actuated due to a signal indicative of a powered panel being actuated for powered movement relative to a stationary structure.

29. The system of claim 28, in which:
said elongated compressible member includes spaced apertures therein;
said lighting being located inside said elongated compressible member so as to be visible at said apertures.

30. The system of claim 29, in which:
said lighting comprises one of an elongated light tube or cable positioned on said mounting member.

31. The system of claim 29, in which said lighting comprises LEDs located at said apertures.

32. The system of claim 30, in which:
said lighting comprises a plurality of LEDs disposed on said elongated member.

33. A method for warning when a movable panel of a vehicle is closing and/or when it is opening regardless of whether or not the presence of an object is detected, said method comprising:
providing a vehicle with a body and a panel which is moved by a powered actuator relative to the body between an open position and a closed position;
providing one of a weather seal or a pinch strip device for securing to one of said panel or said body;
providing lighting operably connected to a portion of the length of one of said weather seal or said pinch strip; and
activating said lighting upon actuation of said powered actuator to close said panel relative to said body.

34. The method according to claim 33, wherein said method further includes:
providing an indicator which indicates at least the movement of said panel when said panel is moving into a closed position relative to said body.

35. The method of claim 34, wherein said method further comprises:
indicating motion of said panel either towards its closed position or its opened position by said indicator; and
activating a light flashing circuit to thereby cause said lighting to flash when said panel is moving either towards its closed position or towards its opened position.

36. The method of claim 35, wherein said method further comprises:
indicating when said movable member is open; and
activating said lighting to remain continuously on when said panel is open.

37. A pinch strip device for mounting on one of a powered movable member or a stationary member, said pinch strip comprising:
a resiliently compressible member;
lighting operably connected to and extending along at least a portion of the length of said compressible member; and
a controller configured to actuate said lighting to emit light continuously or intermittently upon receiving a signal indicating that a powered actuator is being actuated to move said movable member relative to said stationary member.

* * * * *

UNITED STATES PATENT AND TRADEMARK OFFICE
CERTIFICATE OF CORRECTION

| | | |
|---|---|---|
| PATENT NO. | : 7,226,112 B2 | Page 1 of 1 |
| APPLICATION NO. | : 10/846434 | |
| DATED | : June 5, 2007 | |
| INVENTOR(S) | : Ward | |

It is certified that error appears in the above-identified patent and that said Letters Patent is hereby corrected as shown below:

Column 4, line 49: "Vehicle" should be -- vehicle --;

Column 7, line 22: after "compressible" insert -- member --.

Signed and Sealed this

Eleventh Day of December, 2007

JON W. DUDAS
*Director of the United States Patent and Trademark Office*